May 10, 1927.

A. L. CLAYDEN

APPARATUS FOR LUBRICATING INTERNAL COMBUSTION ENGINES

Filed Jan. 5, 1925

1,628,117

WITNESS:

INVENTOR
Arthur Ludlow Clayden
BY
ATTORNEYS.

Patented May 10, 1927.

1,628,117

UNITED STATES PATENT OFFICE.

ARTHUR LUDLOW CLAYDEN, OF RIDLEY PARK, PENNSYLVANIA, ASSIGNOR TO SUN OIL COMPANY, OF PHILADELPHIA, PENNSYLVANIA, A CORPORATION OF NEW JERSEY.

APPARATUS FOR LUBRICATING INTERNAL-COMBUSTION ENGINES.

Application filed January 5, 1925. Serial No. 556.

My invention relates to an improved apparatus for lubricating internal combustion engines, and more particularly for providing initial lubrication on the starting of an engine.

In internal combustion engines such as are commonly used, for example, in automobiles, boats and aircraft, lubrication of the moving parts is effected from a supply of lubricant carried in the crank case or sump of the engine by means of a pump, or by permitting the cranks to dip into the lubricant and splash it throughout the interior of the case; or by a combination of these methods.

In all such engines it is necessary to lubricate the walls of the cylinders on which the pistons run and such are universally lubricated in the final analysis indirectly; that is, by lubricant splashed up by the dipping cranks or by lubricant thrown out from the connecting rod bearings when such are lubricated by means of lubricant forced to them by a pump. Efficient lubrication of the cylinder walls is of the utmost importance since it is not only necessary for the prevention of wear and the reduction of friction, but it is necessary in order to form a seal between the piston rings and the cylinder walls in order to prevent leakage of gaseous pressure.

While in the well designed internal combustion engine the cylinder walls are efficiently lubricated by the methods indicated, during the operation of the engine, it has been recognized that, where an engine is stopped and left to stand idle, the lubricant in the bearings and lubricating system of the engine drains back into the crank case or sump and the lubricant on the cylinder walls will drain off leaving the walls, to all intents and purposes, dry. When the engine is restarted, there is an appreciable space of time before lubricant is again supplied to the cylinder walls, irrespective of the method of lubrication of the engine, since the cylinder walls are the last points reached by the lubricant. As a result, since the pistons start to move when the engine is turned over for starting they run on the dry walls and excessive wear or scuffing takes place, and especially if the engine be immediately loaded.

Further, since, due to the draining away of the oil, there is no seal for the piston rings and during the compression of the fuel mixture a certain amount of gasoline evolved by condensation passes the pistons and deteriorates the lubricant supply in the crank case.

The draining of the lubricant from the bearings and from the cylinder walls when the engine is stopped is facilitated by the fact that it is at its minimum viscosity due to the heat of the engine, and the relubrication of the cylinder walls when the engine is restarted, especially when it has stood for any considerable length of time, is delayed by the fact that having gotten cold the lubricant is at its maximum viscosity.

The draining of the lubricant from the cylinder walls on stopping and the resultant excessive wear and bypassing of gasoline on restarting occurs in all engines, but is especially noticeable in those engines equipped with aluminum pistons, which, being of softer material than the cylinders in which they operate, are especially liable to be abraded or scored when insufficiently lubricated.

Now is it the object of my invention to provide a method and apparatus whereby the cylinder walls of internal combustion engines will be supplied with lubricant independently of the main lubricating system upon the turning over of the engine, whereby excessive wear and scuffing of the pistons will be avoided and a seal will be formed which will prevent bypassing of the gasoline to the crank case.

Further objects of my invention are to provide simple and economical apparatus and such as in its more preferred form will be automatically operated and foolproof.

Having now indicated, in a general way, the nature, purpose and advantage of my invention, I will proceed to a detailed description thereof, with reference to the accompanying drawings, in which—

Figure 1:
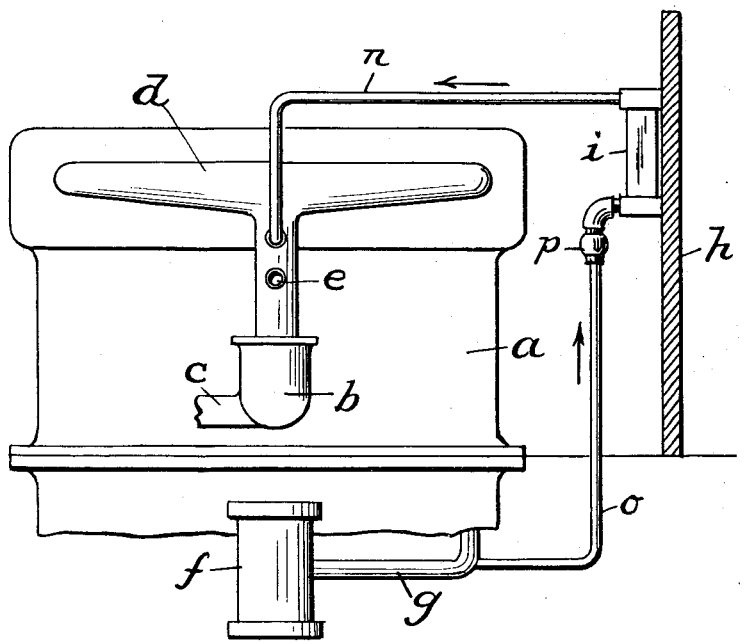
Fig. 1 is a diagrammatic view of a part of an internal combustion engine equipped with apparatus embodying my invention.
Figure 2:
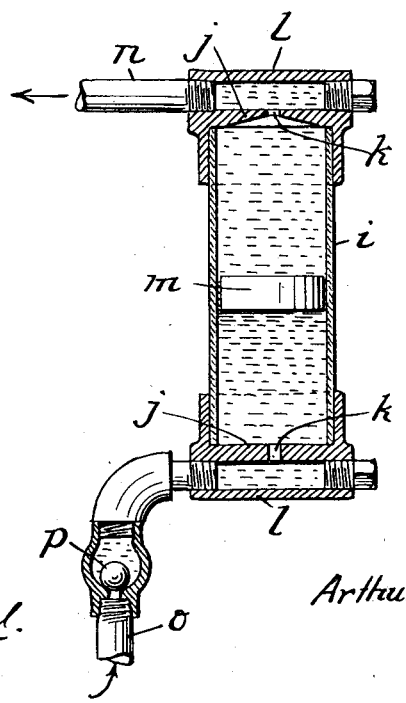
Fig. 2 is a sectional view of a form of apparatus embodying my invention.

In the drawings, a indicates an internal combustion engine, the lower half of the crank case or sump being partially broken away. b indicates a carbureter, provided with an air intake pipe c and connected in any well known manner to a vacuum tank, not shown, from which it receives a supply of gasoline. d indicates the usual intake manifold affording a passage for the fuel mixture from the carbureter to the several cylinders of the engine, and connected with the usual vacuum tank at a point e. f indicates an oil pump supplied with oil from the usual supply carried in the engine crank case and serving to pump oil to the bearings of the engine through a discharge pipe g.

Suitably supported adjacent the engine, in the drawings shown supported on a dashboard h, is a cylindrical chamber i, the ends of which are closed by means of heads j, each apertured or ported centrally as at k and provided with hollow bosses l, with which the chamber is in communication through ports k. The bosses are plugged at one end and tapped for pipe connection at the other end.

Within the chamber i is a disc m of slightly less diameter than the interior of the chamber in order to have an easy sliding fit therein.

A pipe n is connected to the boss on the upper head l of the chamber and to the intake manifold d of the engine, at a point, for example, just above the point e where the vacuum tank is connected.

The lower boss l of the chamber is connected by means of a pipe o, in which is a check valve p, to the pump discharge pipe g.

It will now be appreciated that if the engine be turned over causing a reduction of pressure or partial vacuum in the intake manifold due to the action of the engine pistons, a partial vacuum will be created in chamber i. This partial vacuum will cause the disc m to be lifted, by the pressure beneath it, up to the top of the chamber and will bear against the underside of the upper head j, and acting as a valve to effectually close communication between the pipe n and the interior of the chamber. Since pipe n is constantly under vacuum, while the engine is running, the disc will be held up against head j, while the engine continues to run.

When the engine is turned over, the pump f is actuated and oil discharged into pipe g and from pipe g, through pipe o and check valve p into chamber i filling the chamber.

With chamber i full of oil, if the engine be stopped disc m will settle to the bottom of the chamber, bypassing the oil, which is prevented from draining out of the chamber by check valve p, the settling of the disc m has the effect of metering a measured quantity of oil. If now the engine be restarted the oil in the chamber above disc m will be drawn by suction and forced by the disc m, lifted by the pressure on the oil pumped into the chamber by pump f through aperture k and injected into the intake manifold, in which it mixes with the fuel and is carried into the cylinders where it contacts with the cylinder walls and serves to thoroughly lubricate them and seal the piston rings. Thus, practically instantaneously with the starting of the engine, the cylinders are supplied with an excess of oil effecting their lubrication independently of the pump, before oil fed through the bearings by the pump is effective to lubricate them, and a seal is formed which prevents gasoline from passing the pistons.

When all the oil in chamber i has been drawn into the manifold, the cylinders will have warmed up and will be receiving normal lubrication and the disc m will have reached the top of the chamber shutting off the aperture k in the upper head, where it is retained by suction allowed to act on the major portion of the disc by the bevelled edge of the aperture, thereby preventing the passage of any more oil to the manifold. During the operation of the engine, the pump keeps the chamber i full of oil under pressure which tends to maintain the disc in position to close aperture k and which is prevented from draining out on the stopping of the engine by the check valve p, so that when the engine is stopped and the disc m settles to the bottom of the chamber a supply of oil is metered and made available for injection into the engine when the engine is again turned over.

It will be noted that the oil in chamber i, metered by disc m when the engine is stopped, is injected into the manifold both under the influence of the vacuum therein and by the foregoing action of disc m, which, under the influence of the pump pressure entering the chamber through pipe o, acts as a piston. Thus, the disc m acts, when the engine is stopped, as a metering valve, and, when the engine is turned over, as a piston, and finally, when the metered quantity of oil is forced out of the chamber, as a valve to prevent the passage of any more oil to the cylinder. If, for any reason, it be undesirable to inject the lubricant into the manifold, the metered lubricant may be injected into the cylinders through suitable conduits connected to the cylinders and chamber i, under the influence of the oil pump pressure on disc m in its capacity as a piston.

It will be readily appreciated that the apparatus herein described is capable of various modifications to suit engines having various lubricating systems, or it can be supplied with oil from any suitable source and in any suitable manner without departing from the spirit of my invention.

Having now fully described my invention, what I claim and desire to protect by Letters Patent is:

1. Means for preliminarily lubricating an internal combustion engine having a cylinder and an intake passage leading thereto, comprising a lubricant supply, a conduit affording a connection between the supply and said intake passage and means in said conduit adapted under the influence of atmospheric pressure to permit the flow to said passage of a definite amount of lubricant and to prevent the further flow of lubricant to said passage by the suction of the engine.

2. Means for preliminarily lubricating an internal combustion engine having a cylinder and an intake passage leading thereto, comprising a lubricant supply, a conduit affording a connection between the supply and said intake passage, and means in said conduit adapted under the influence of the pressure in the intake passage to permit the flow of a definite amount of lubricant to the passage and to prevent the further flow of lubricant thereto before the engine has been stopped.

3. A system for lubricating an internal combustion engine, comprising means for feeding lubricant to the cylinder when starting and means controlled by the running of the engine for cutting off said feed of lubricant at a predetermined time after starting.

4. Means for lubricating an internal combustion engine having a cylinder, comprising means adapted to act automatically when the engine is stopped to meter a measured quantity of lubricant, and means for introducing the metered lubricant into the cylinder when the engine is again started.

5. Means for lubricating an internal combustion engine having a cylinder and an oil pump, comprising a valve adapted to automatically meter a measured quantity of lubricant when the engine is stopped, and means for introducing the metered lubricant into the cylinder when the engine is again turned over.

6. Means for lubricating an internal combustion engine having an intake manifold, comprising a reservoir for oil, means for the supplying of oil to said reservoir, a conduit affording communication between said reservoir and the intake manifold, and means within said reservoir adapted to be actuated by the vacuum in said intake to shut off communication through said conduit.

7. Means for lubricating an internal combustion engine having an intake manifold and a lubricant conduit leading thereto, means in said conduit for metering a definite quantity of lubricant thereto when the engine is stopped, said means also being arranged to permit the drawing of the metered lubricant into the manifold when the engine is started and to stop the flow of lubricant after the metered quantity has been delivered to the manifold.

8. Means for lubricating an internal combustion engine having an oil supply and an intake manifold, comprising a reservoir for oil, a conduit affording communication between said reservoir and the oil supply, a conduit affording communication between said reservoir and the intake manifold, and means controlled by the pressure in the intake manifold for controlling communication through said last mentioned conduit.

9. Means for lubricating an internal combustion engine having an oil supply and an intake manifold, comprising a reservoir for oil, a conduit affording communication between said reservoir and the oil supply, a one-way valve in said conduit, a conduit affording communication between said reservoir and the inlet manifold, and means controlled by the pressure in the intake manifold for controlling communication through said last mentioned conduit.

10. Means for lubricating an internal combustion engine having an oil supply and an intake manifold, comprising a reservoir for oil, a conduit affording communication between said reservoir and the oil supply, a one-way valve in said conduit, a conduit affording communication between said reservoir and the intake manifold, and a valve member within said chamber and adapted to permit a predetermined amount of lubricant to flow from the chamber to the intake manifold when the engine is started and to check the further flow of lubricant after the delivery of the predetermined quantity.

11. Means for lubricating an internal combustion engine having an oil supply and an intake manifold, a reservoir for oil, a conduit affording communication between the lower end of said reservoir and the oil supply, a one-way valve in said conduit, a conduit affording communication between the upper end of said conduit and the intake manifold, and a valve member adapted when the engine is stopped to assume a position at the bottom of said reservoir and after the engine is turned over to be lifted into and retained in position at the top of said reservoir and shut off communication through said last mentioned conduit.

12. Means for lubricating an internal combustion engine having an oil pump and an intake manifold, comprising a reservoir for oil, a conduit affording communication between the lower end of said reservoir and the discharge of said pump whereby oil is supplied to said reservoir, a one-way valve in said conduit, a conduit affording communication between the upper end of said reservoir and the intake manifold, and a valve member slidable in said reservoir adapted when the engine is turned over to be drawn to the upper end of said reservoir to shut off communication through said last mentioned conduit and when said engine is stopped to settle to the bottom of said reservoir bypassing oil supplied thereto by the pump.

13. Means for lubricating an internal combustion having an intake manifold, comprising a reservoir for oil, means for the supply of oil to said reservoir, a conduit affording communication between said reservoir and the intake manifold, and means within said reservoir adapted under the influence of vacuum in said intake manifold when the engine is turned over to shut off communication through said conduit and when the engine is stopped to meter a quantity of oil from said supply.

14. Means for lubricating an internal combustion engine having a cylinder and an oil pump, comprising a chamber, a conduit affording communication between the chamber and the pump, a conduit affording communication between the chamber and the cylinder, and a member slidable in said chamber and adapted when the engine is stopped to meter a quantity of lubricant and when the engine is again turned over to be actuated by the pressure developed by the pump to force the metered lubricant to the cylinder.

15. Means for lubricating an internal combustion engine having a cylinder and an oil pump, comprising a cylindrical chamber, conduits affording communication between said chamber and the pump and between said chamber and the cylinder, and a disc slidable in said chamber, said disc being adapted when the engine is stopped to move in one direction under the influence of gravity and meter a predetermined quantity of lubricant and when the engine is turned over to move in the opposite direction under the influence of pressure from said oil pump and eject the lubricant from said chamber, said disc being adapted after the ejection of the metered lubricant to be maintained by the pressure from said oil pump in a position to prevent the passage of lubricant from said chamber to the cylinder.

In testimony of which invention, I have hereunto set my hand, at Philadelphia, Pennsylvania, on this 31st day of December, 1924.

ARTHUR LUDLOW CLAYDEN.